(12) United States Patent
Sekiya et al.

(10) Patent No.: US 12,017,314 B2
(45) Date of Patent: Jun. 25, 2024

(54) FIXED TEMPERATURE LIQUID SUPPLY APPARATUS

(71) Applicant: DISCO CORPORATION, Tokyo (JP)

(72) Inventors: Kazuma Sekiya, Tokyo (JP); Miki Yoshida, Tokyo (JP); Kei Mine, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 11 days.

(21) Appl. No.: 17/813,160

(22) Filed: Jul. 18, 2022

(65) Prior Publication Data

US 2023/0043272 A1 Feb. 9, 2023

(30) Foreign Application Priority Data

Aug. 4, 2021 (JP) ................................. 2021-128202

(51) Int. Cl.
*B23Q 11/14* (2006.01)
(52) U.S. Cl.
CPC ................................. *B23Q 11/141* (2013.01)
(58) Field of Classification Search
CPC .................................................. B23Q 11/141
USPC ......................................................... 165/206
See application file for complete search history.

(56) References Cited

U.S. PATENT DOCUMENTS

| | | | | |
|---|---|---|---|---|
| 5,479,788 A | * | 1/1996 | Roegner | F25B 45/00 62/77 |
| 7,610,756 B2 | * | 11/2009 | Hatta | H01L 21/68714 60/524 |
| 7,845,308 B1 | * | 12/2010 | Corneille | H05B 6/806 118/667 |
| 7,938,174 B2 | * | 5/2011 | Yanagida | F25D 17/02 165/206 |
| 10,183,370 B2 | * | 1/2019 | Matsumoto | G01K 13/00 |
| 2017/0341198 A1 | * | 11/2017 | Matsumoto | B23Q 11/141 |
| 2019/0255672 A1 | * | 8/2019 | Arai | B23Q 11/127 |

FOREIGN PATENT DOCUMENTS

| | | |
|---|---|---|
| JP | 2007127343 A | 5/2007 |
| JP | 2017156017 A | 9/2017 |
| JP | 2017215063 A | 12/2017 |

* cited by examiner

*Primary Examiner* — Raheena R Malik
(74) *Attorney, Agent, or Firm* — Greer Burns & Crain Ltd.

(57) ABSTRACT

A fixed temperature liquid supply apparatus for supplying liquid adjusted in temperature to a processing apparatus including a processing unit includes a tank that accommodates the liquid, a thermometer that measures the temperature of the liquid accommodated in the tank, and a compressed gas supply pipe one end of which is connected to a compressed gas source reserving a compressed gas, the other end of which reaches the tank, and which supplies the compressed gas from the compressed gas source to the tank. The liquid accommodated in the tank is cooled by bubbles of the compressed gas, and the cooled liquid is supplied to the processing apparatus.

5 Claims, 4 Drawing Sheets

FIXED TEMPERATURE LIQUID SUPPLY APPARATUS

BACKGROUND OF THE INVENTION

Field of the Invention

The present invention relates to a fixed temperature liquid supply apparatus for supplying liquid at a fixed temperature to a processing apparatus that processes a workpiece such as a semiconductor wafer.

Description of the Related Art

In the manufacturing process of device chips used for electronic apparatuses such as mobile phones and personal computers, first, a plurality of intersecting planned dividing lines (streets) are set on a front surface of a wafer formed of a semiconductor or the like. Then, devices such as integrated circuits (ICs) and large scale integration (LSI) circuits are formed in regions partitioned by the streets. Thereafter, the wafer is divided along the streets, and individual device chips are thus formed.

For dividing the wafer, a cutting apparatus is used. The cutting apparatus includes a spindle and an annular cutting blade mounted to a tip of the spindle. At the time of cutting the wafer, the spindle is rotated to rotate the cutting blade, and the cutting blade is lowered to a predetermined height. Then, the wafer and the cutting blade are relatively moved, and the cutting blade is made to cut into the wafer along the street. In addition, for obtaining thin device chips at the end, the wafer that has not yet been divided is ground from the back surface side thereof by a grinding apparatus and thinned. The grinding apparatus includes a spindle and an annular grinding wheel mounted to a lower end of the spindle. The grinding wheel has grindstones arranged in an annular pattern. With the spindle rotated, the grinding wheel is rotated, the grinding wheel is lowered toward the back surface of the workpiece, and the grindstones are brought into contact with the workpiece, whereby the workpiece is ground.

When the workpiece is processed by these processing apparatuses, the temperatures of the spindle constituting the processing unit, the processing tool such as the cutting blade and the grinding wheel, and the workpiece are raised under the influence of friction, and thermal expansion is generated in the spindle, the processing tool, the workpiece, and the like, possibly changing the result of processing. In view of this, to process the workpiece with little variability in the processing apparatus, it is important to accurately control the temperature of the processing unit and the temperature of the workpiece to thereby prevent the influence of thermal expansion from being generated. Thus, the processing unit is circularly supplied with liquid such as cooling water adjusted to a predetermined temperature, and the processing tool and the workpiece are supplied with liquid adjusted to a predetermined temperature. A fixed temperature liquid supply apparatus for supplying liquid at a predetermined temperature is connected to and used with the processing apparatus (see, for example, Japanese Patent Laid-open No. 2007-127343, Japanese Patent Laid-open No. 2017-215063, and Japanese Patent Laid-open No. 2017-156017).

SUMMARY OF THE INVENTION

The fixed temperature liquid supply apparatus includes cooling means or temperature adjusting means for adjusting the temperature of the liquid, and these means are mainly driven by electric power, so that operation of the fixed temperature liquid supply apparatus needs non-negligible cost. In addition, such a fixed temperature liquid supply apparatus often has an ability to supply liquid such as water at a predetermined temperature simultaneously to a plurality of processing apparatuses, and has cooling means or the like having output for realizing the ability. Therefore, for example, even in a case of supplying a fixed temperature liquid to one processing apparatus, it is necessary to operate high-output cooling means, thereby relatively increasing the operation cost.

Accordingly, it is an object of the present invention to provide a fixed temperature liquid supply apparatus which is low in operation cost, is simple and small in configuration, and is yet able to adjust liquid to a predetermined temperature.

In accordance with an aspect of the present invention, there is provided a fixed temperature liquid supply apparatus that supplies liquid adjusted in temperature to a processing apparatus including a processing unit having a spindle equipped with a processing tool and a motor for rotating the spindle. The fixed temperature liquid supply apparatus includes a tank that accommodates the liquid, a thermometer that measures the temperature of the liquid accommodated in the tank, and a compressed gas supply pipe one end of which is connected to a compressed gas source reserving a compressed gas, the other end of which reaches the tank, and which supplies the compressed gas from the compressed gas source to the tank. The liquid accommodated in the tank is cooled by bubbles of the compressed gas, and the cooled liquid is supplied to the processing apparatus.

Preferably, the fixed temperature liquid supply apparatus further includes a filter that is connected to the other end of the compressed gas supply pipe and that discharges the supplied compressed gas as the bubbles into the liquid.

More preferably, the liquid supplied to the processing apparatus cools the processing unit, thereafter returns to the tank, is cooled by the bubbles, and is again supplied to the processing apparatus, to be thereby circulated.

In addition, preferably, the liquid supplied to the processing apparatus is supplied to the processing tool and is utilized as a processing liquid.

Besides, preferably, the liquid is pure water, and the compressed gas is compressed air.

The fixed temperature liquid supply apparatus according to one mode of the present invention includes the tank accommodating the liquid and the compressed gas supply pipe of which one end is connected to the tank. When the compressed gas is supplied from the compressed gas supply pipe into the liquid accommodated in the tank, the bubbles of the compressed gas are generated in the liquid. In this instance, since the temperature of the bubbles is lowered attendant on the expansion of the compressed gas, the liquid making contact with the bubbles during rising of the bubbles inside the tank is cooled. In other words, the liquid can be cooled by the simple configuration of supply of the compressed gas to the liquid accommodated in the tank, so that large-scale cooling means is unnecessary, and the fixed temperature liquid supply apparatus can be reduced in size. In addition, since the electric power or motive power for operating the fixed temperature liquid supply apparatus can be extremely little, operation cost is reduced.

Therefore, according to one mode of the present invention, there is provided a fixed temperature liquid supply apparatus which is low in operation cost, is simple and small in configuration, and is yet able to adjust liquid to a predetermined temperature.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will be described in detail below with reference to the attached drawings. A fixed temperature liquid supply apparatus according to the present embodiment is used, for example, by being connected to various processing apparatuses for processing a workpiece. The processing apparatus is, for example, a cutting apparatus for cutting a thin plate-shaped workpiece such as a semiconductor wafer, a grinding apparatus for grinding the workpiece, a cutting apparatus for cutting the workpiece, a polishing apparatus for polishing the workpiece, a laser processing apparatus for laser processing the workpiece, or the like.

The cutting apparatus has an annular cutting blade as a processing tool, a spindle equipped with the cutting blade at a tip thereof is rotated, and the rotating cutting blade is brought into contact with the workpiece, to thereby cut the workpiece. The grinding apparatus has, as a processing tool, a grinding wheel having a plurality of grindstones arranged in an annular pattern, a spindle equipped with the grind wheel at a lower end thereof is rotated, and the grindstones moving on an annular locus is brought into contact with the workpiece, to thereby grind the workpiece. The polishing apparatus has a disk-shaped polishing pad as a processing tool, a spindle equipped with the polishing pad at a lower end thereof is rotated, and the rotating polishing pad is brought into contact with the workpiece, to thereby polish the workpiece. The present embodiment will be described taking as an example a case where the processing apparatus connected to the fixed temperature liquid supply apparatus is the cutting apparatus, but the fixed temperature liquid supply apparatus is not limited to this. The fixed temperature liquid supply apparatus may be connected to another processing apparatus, and may be connected to another apparatus than the processing apparatus.

Figure 2:
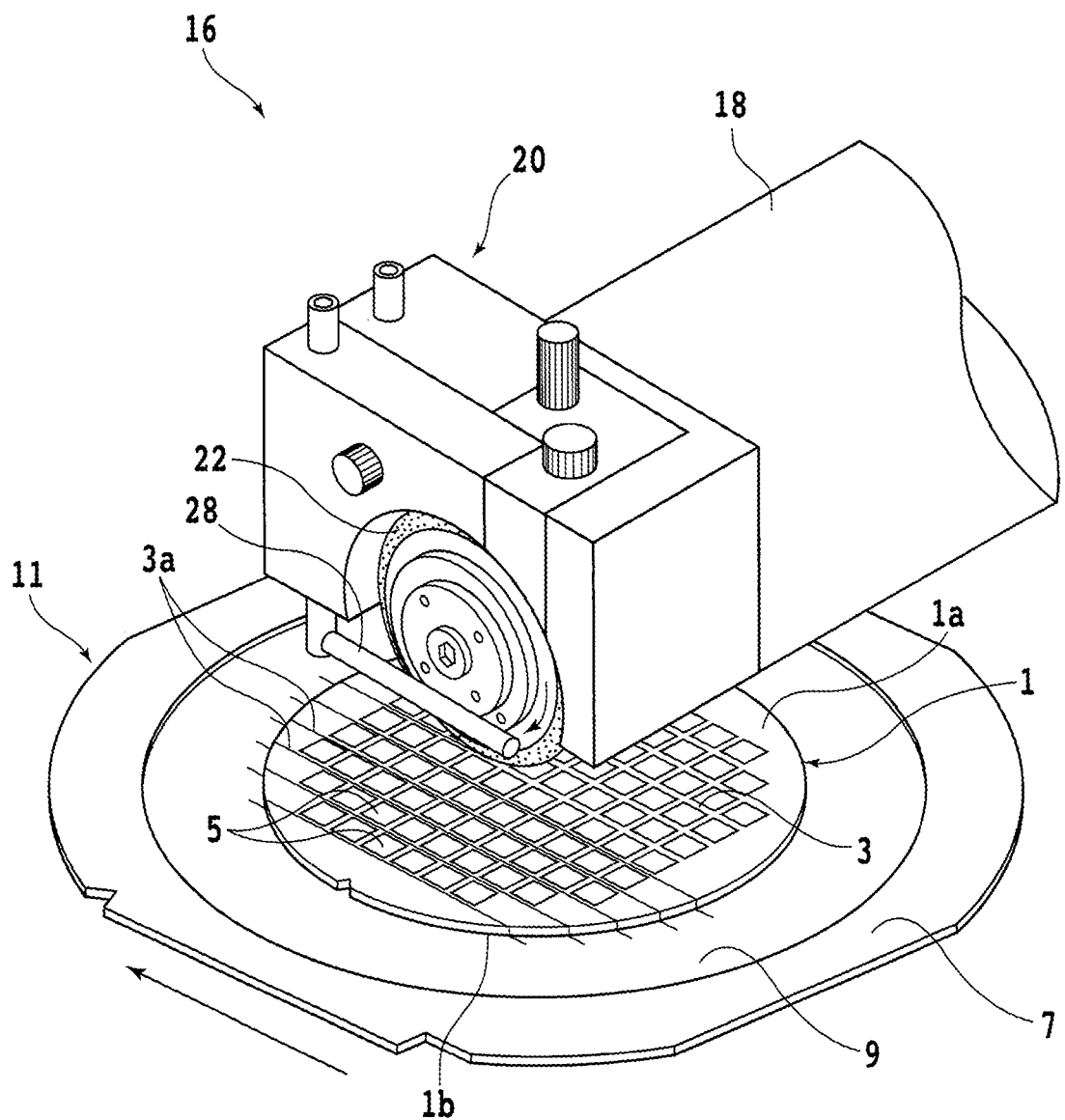
FIG. 2 is a perspective view schematically depicting the manner of processing a workpiece by the processing apparatus.

The workpiece to be processed by the processing apparatus is, for example, a substantially disk-shaped wafer formed from silicon (Si), silicon carbide (SiC), gallium nitride (GaN), gallium arsenide (GaAs), or other semiconductor materials. Alternatively, the workpiece is a plate-shaped substrate or the like formed from a material such as sapphire, quartz, glass, or ceramic. The glass is, for example, alkali glass, non-alkali glass, soda-lime glass, lead glass, borosilicate glass, or quartz glass. It is to be noted that the workpiece is not particularly limited to any kind. FIG. 2 includes a perspective view schematically depicting a disk-shaped semiconductor wafer as an example of the workpiece denoted by 1. For example, a plurality of devices 5 such as ICs and LSI circuits are formed on a front surface 1a of the workpiece 1. A plurality of streets 3 are set between the devices 5 on the workpiece 1. Then, when the workpiece 1 is cut along the streets 3 by the cutting apparatus to form division grooves 3a to thereby cut the workpiece 1, individual device chips can be formed.

Before being conveyed in to the cutting apparatus, the workpiece 1 is united with a dicing tape 9 and a ring frame 7 to form a frame unit 11. The dicing tape 9 is attached to the ring frame 7 in such a manner as to close the opening of the ring frame 7, and a back surface 1b side of the workpiece 1 is attached to the dicing tape 9 exposed in the opening. When the frame unit 11 is formed, the workpiece 1 can be handled through the ring frame 7 and the dicing tape 9, so that the workpiece 1 becomes easy to be handled. Moreover, the device chips formed by the workpiece 1 being divided are fixed as they are to the dicing tape 9, it is also easy to handle the device chips. When the dicing tape 9 is expanded radially outward in the inside of the opening of the ring frame 7 after the workpiece 1 is divided, gaps are formed between the individual device chips, so that pick-up of the device chips is also easy.

Figure 1:
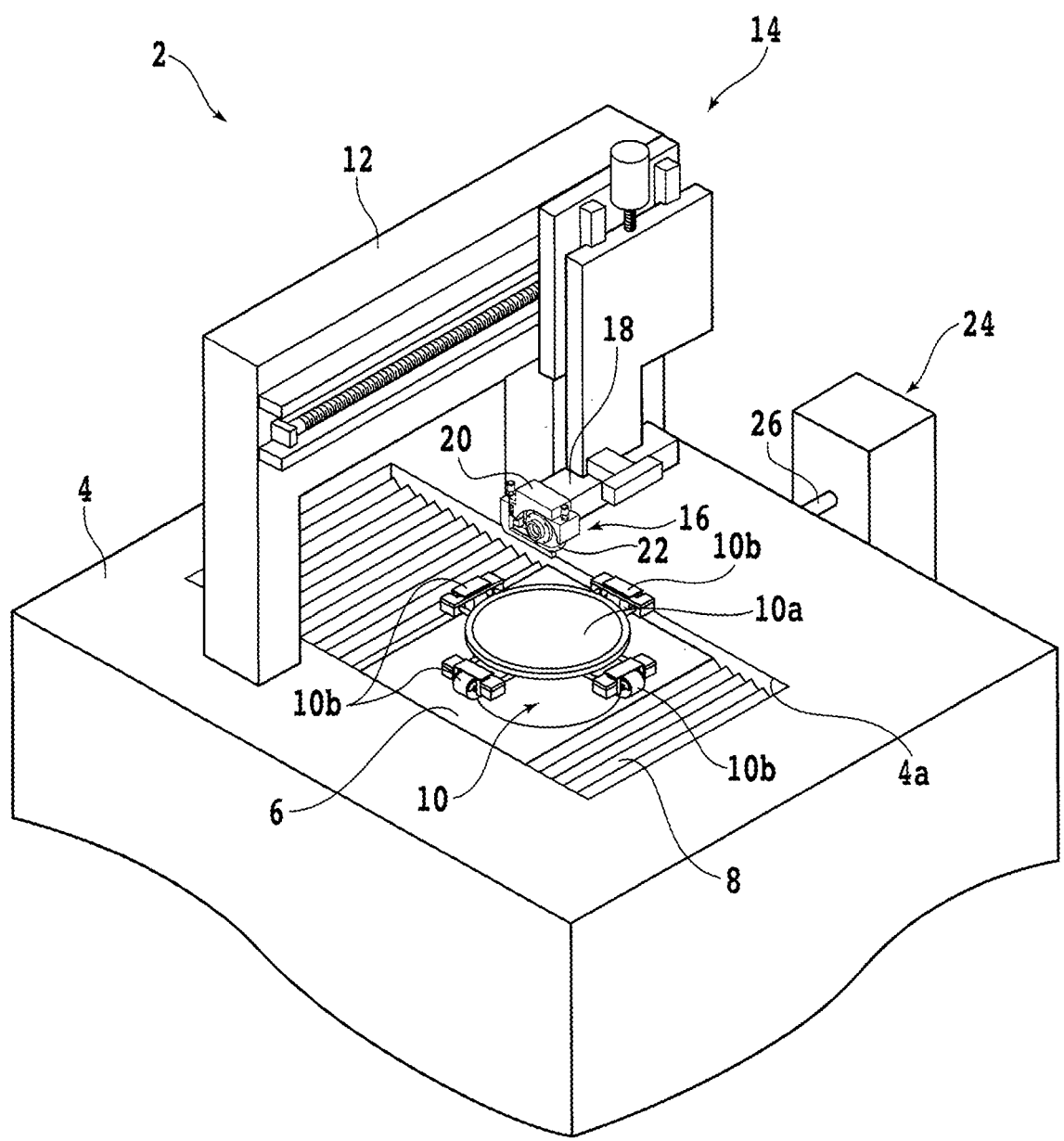
FIG. 1 is a perspective view schematically depicting a processing apparatus and a fixed temperature liquid supply apparatus.

Next, the cutting apparatus will be described as an example of the processing apparatus to which the fixed temperature liquid supply apparatus is connected. FIG. 1 is a perspective view schematically depicting the cutting apparatus 2. The cutting apparatus 2 has a base 4 that supports each constituent element. At an upper surface of the base 4, a rectangular opening 4a is formed, and a gate-like support structure 12 for supporting a cutting unit 16 for cutting the workpiece 1 is disposed astride the opening 4a. At an upper part on the front side of the support structure 12, a cutting unit moving mechanism 14 for moving the cutting unit 16 in an indexing feeding direction and in the vertical direction is provided. The opening 4a of the base 4 is formed in a rectangular shape elongate in a processing feeding direction perpendicular to the indexing feeding direction and the vertical direction. In the opening 4a, there are provided a moving table (not illustrated), a moving mechanism (not illustrated) for moving the moving table in the processing feeding direction, and dustproof and droplet-proof covers 6 and 8.

On the moving table, a chuck table 10 for holding the workpiece 1 under suction is disposed. On the upper surface side of the chuck table 10, a porous member is disposed, and a suction passage (not illustrated) connected at one end thereof to a suction source is connected to the porous member. An upper surface of the porous member is a holding surface 10a. In addition, the chuck table 19 further includes clamps 10b for fixing the ring frame 7 constituting the frame unit 11, on the radially outer side of the holding surface 10a. When the frame unit 11 is placed on the holding surface 10a of the chuck table 10, the ring frame 7 is fixed by the clamps 10b, and the suction source is operated, a negative pressure acts on the workpiece 1, whereby the workpiece 1 is held under suction on the chuck table 10, with the dicing tape 9 interposed therebetween.

The cutting unit (processing unit) 16 includes a spindle (not illustrated) along the indexing feeding direction, a spindle housing 18 that supports the spindle in a rotatable manner, and an annular cutting blade (processing tool) 22 mounted on one end side of the spindle. The cutting blade 22 is covered with a blade cover 20. A rotational drive source (not illustrated) such as a motor is connected to the other end side of the spindle, and the cutting blade 22 is rotated by a rotating force transmitted from the rotational drive source through the spindle.

FIG. 2 is a perspective view schematically depicting the manner of cutting the workpiece 1 by the cutting unit 16. To cut the workpiece 1 by the cutting blade 22, the cutting blade 22 is positioned on an extension of the street 3 of the workpiece 1, the rotational drive source is operated to start rotation of the cutting blade 22, and the cutting blade 22 is lowered to cut into the surface of the dicing tape 9. Thereafter, the chuck table 10 is moved to thereby move the frame unit 11 in the processing feeding direction, whereby the cutting blade 22 is made to cut into the workpiece 1, to form the division groove 3a. Thereafter, the cutting blade 22 is raised, is moved onto an extension of another street 3, and is similarly made to cut into another street 3. After the workpiece 1 is cut along all the streets 3 aligned in the same direction, the chuck table 10 is rotated, to align the street 3 along the other direction to the processing feeding direction of the cutting apparatus 2. Then, the workpiece 1 is similarly cut, whereon the workpiece 1 is divided into the individual device chips.

Here, when the cutting blade 22 is made to cut into the workpiece 1, cutting swarf is generated from the workpiece 1 and the grindstone part of the cutting blade 22. In addition, frictional heat is generated between the workpiece 1 and the cutting blade 22. In view of this, the cutting unit 16 has a pair of cutting water supply nozzles 28 for supplying cutting water such as pure water to the workpiece 1 and the cutting blade 22 when the workpiece 1 is subjected to cutting. The pair of cutting water supply nozzles 28 extend on lateral sides of the cutting blade 22 in such a manner as to be located on opposite lateral sides of the cutting blade 22. When the cutting water is supplied from the cutting water supply nozzles 28 to the workpiece 1 and the cutting blade 22 during cutting of the workpiece 1, the cutting swarf and frictional heat generated due to cutting are removed by the cutting water. Therefore, the workpiece 1 can be cut stably.

Note that, when the rotational drive source for rotating the cutting blade 22 is operated, frictional heat attendant on the rotation of the spindle and the like is generated. When the temperature of the spindle and the like is raised and thermal expansion occurs, the position of the cutting blade 22 is changed to be unsuitable for proper cutting of the workpiece 1. Therefore, while the rotational drive source is operated, the rotational drive source needs to be cooled to be maintained at a fixed temperature. In view of this, a fixed temperature liquid supply apparatus 24 (see FIG. 1) is connected to the cutting apparatus (processing apparatus) 2, and liquid at the fixed temperature is supplied from the fixed temperature liquid supply apparatus 24. Then, the liquid fed from the cutting apparatus (processing apparatus) 2 and raised in temperature is returned to the fixed temperature liquid supply apparatus 24, is cooled to the predetermined temperature, and is sent again to the cutting apparatus (processing apparatus) 2. In other words, the cutting unit 16 is cooled by the circulating liquid.

Figure 3:
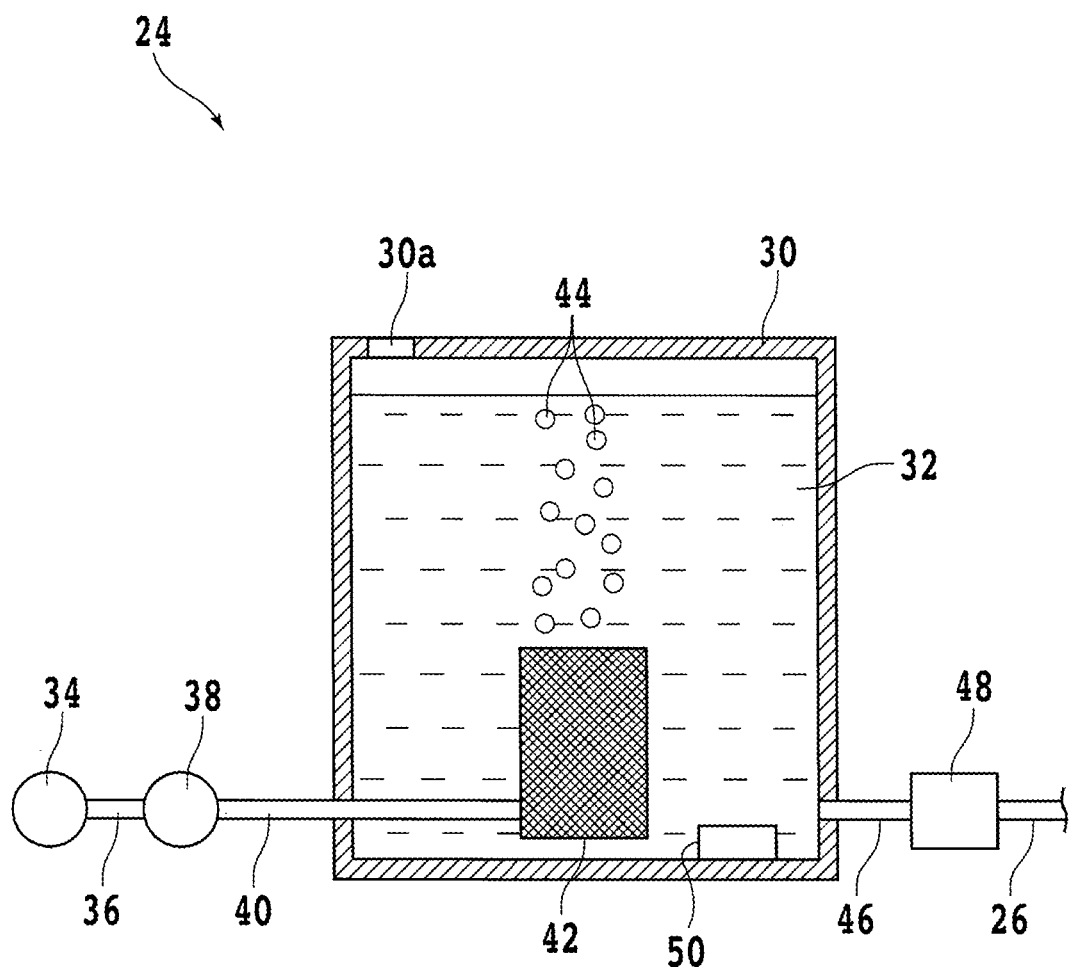
FIG. 3 is a sectional view schematically depicting an example of a tank.

Next, the fixed temperature liquid supply apparatus 24 according to the present embodiment will be described below. FIG. 3 is a sectional view schematically depicting the constituent elements of the fixed temperature liquid supply apparatus 24. The fixed temperature liquid supply apparatus 24 includes a tank 30 accommodating liquid 32, a thermometer 50 for measuring the temperature of the liquid 32 accommodated in the tank 30, and compressed gas supply pipes 36 and 40 connected to the tank 30. Each of the compressed gas supply pipes 36 and 40 has one end thereof connected to a compressed gas source 34 reserving a compressed gas, and has the other end thereof reaching the tank 30. The compressed gas supply pipes 36 and 40 are equipped with a regulator 38. The regulator 38 can switch the supply and stoppage of the compressed gas supplied from the compressed gas source 34 to the tank 30, and can adjust the supply pressure of the compressed gas.

The liquid 32 accommodated in the tank 30 is sent to the cutting apparatus (processing apparatus) 2, is raised in temperature in the process of cooling by removing heat of a predetermined object, and is returned again to the tank 30. In other words, the liquid 32 functions as a coolant. The kind of the liquid 32 is not particularly limited to any kind, and may be selected based on the temperature which is to be maintained as the temperature of the object of cooling. For example, in a case where the temperature of the object of cooling is desired to be maintained at a temperature on the order of room temperature, it is recommendable to use pure water as the liquid 32. On the other hand, in a case where the temperature of the object of cooling is desired to be maintained at a temperature of equal to or higher than 100° C., it is recommendable to use an oil as the liquid 32.

The compressed gas supply pipes 36 and 40 having one end thereof connected to the compressed gas source 34 extend into the inside of the tank 30, and a porous filter 42 is connected to the other end thereof. The filter 42 is, for example, a hollow filter formed from resin. Alternatively, the filter 42 may be formed from a material such as ceramic. The filter 42 preferably has numerous minute holes of a size on the order of 0.1 μm. The filter 42 is disposed near a bottom part of the tank 30, and is immersed in the liquid 32. The tank 30 is formed in an upper part thereof with a ventilation hole 30a.

At the time of lowering the temperature of the liquid 32 accommodated in the tank 30, the regulator 38 is operated, and the compressed gas is supplied from the compressed gas source 34 to the filter 42 through the compressed gas supply pipes 36 and 40. The compressed gas supplied to the filter 42 is discharged through the minute holes of the filter 42 into the liquid 32, to become bubbles 44. In this instance, since the compressed gas is released from the high pressure state and abruptly expands, the temperature of the gas is abruptly lowered. Therefore, in the inside of the tank 30, the lowtemperature bubbles 44 jetted from the filter 42 rise in the liquid 32. The liquid 32 making contact with the bubbles 44 in this process is cooled by the bubbles 44, so that the temperature of the liquid 32 is lowered. In other words, in the fixed temperature liquid supply apparatus 24 according to the present embodiment, the liquid 32 accommodated in the tank 30 is cooled by the bubbles 44 of the compressed gas which is lowered in temperature attendant on expansion. Then, the cooled liquid 32 is supplied from the tank 30 to the cutting apparatus (processing apparatus) 2.

The compressed gas supplied from the compressed gas source 34 to the filter 42 and discharged into the liquid 32 is preferably poor in reactivity with the liquid 32 and is preferably a gas low in solubility to the liquid 32. If the compressed gas is a gas which reacts with the liquid 32 or is dissolved in the liquid 32 upon being discharged into the liquid 32, it may be impossible to sufficiently cool the liquid 32, or the properties of the liquid 32 may largely be changed, possibly damaging the fixed temperature liquid supply apparatus 24 and the cutting apparatus (processing apparatus) 2. In view of this, the compressed gas is, for example, preferably compressed air or compressed nitrogen, or may be compressed inert gas, compressed oxygen, compressed hydrogen, or the like. Note that, for ease of acquirement and management of materials and safety, the compressed gas is most preferably compressed air or compressed nitrogen.

When the bubbles 44 reach the upper surface of the liquid 32, the gas contained in the bubbles 44 escapes from the liquid 32 to go to a surplus space in the tank 30, and is discharged out of the tank 30 through the ventilation hole 30a. Therefore, the internal pressure in the tank 30 is not raised excessively. Here, as the time in which the bubbles 44 move in the liquid 32 is longer, heat exchange between the bubbles 44 and the liquid 32 progresses more easily, and the liquid 32 is cooled more efficiently. In view of this, the size of the tank 30 is desirably contrived such that the time until the bubbles 44 are released from the liquid 32 is longer. In other words, the tank 30 is preferably elongate along the vertical direction. For example, in a case where the tank 30 is rectangular parallelepiped in shape, the height is preferably greater than the sides of the bottom surface. In a case where the tank 30 is cylindrical in shape, the height is preferably greater than the diameter of the bottom surface. In a case where the tank 30 is other shapes, the height is preferably greater than the square root of the sectional area of the tank 30. Note that the sizes of the tank 30 are not limited to these.

Figure 4:
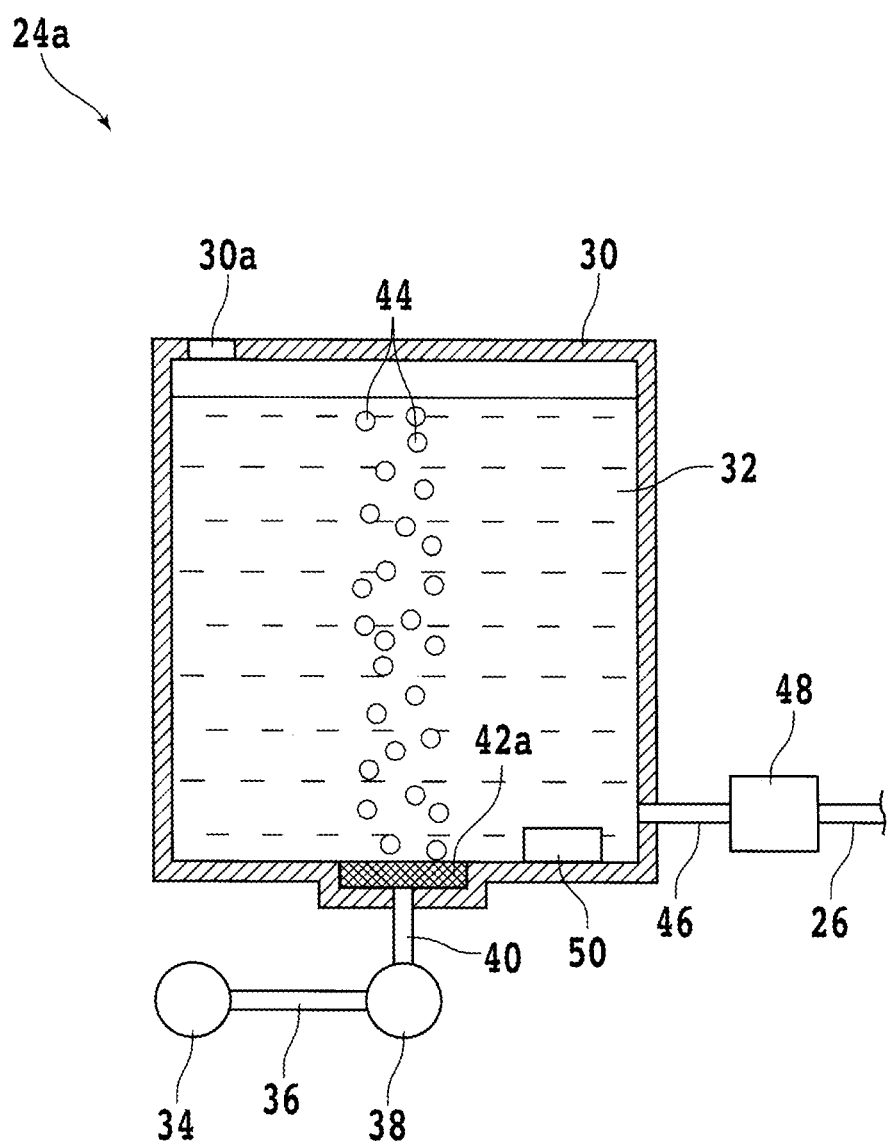
FIG. 4 is a sectional view schematically depicting another example of the tank.

In addition, as the position where the filter 42 is disposed is nearer to the bottom surface of the tank 30, the time for the bubbles 44 to be released out of the liquid 32 becomes longer. Therefore, for example, the filter 42 may be embedded in the bottom surface of the tank 30. FIG. 4 is a sectional view schematically depicting a fixed temperature liquid supply apparatus 24a according to a modification. In the fixed temperature liquid supply apparatus 24a according to the modification, a filter 42a is embedded in the bottom surface of the tank 30, and the compressed gas supply pipes 36 and 40 reaching the tank 30 are connected to the filter 42a. Since the bubbles 44 discharged from the filter 42a move the whole height from the bottom surface of the tank 30 to the upper surface of the liquid 32, the liquid 32 is cooled at high efficiency by the bubbles 44.

Returning to FIG. 3, the fixed temperature liquid supply apparatus 24 will be further described. When the bubbles 44 are discharged from the filter 42 into the liquid 32, a flow attendant on the movement of the bubbles 44 is generated in the liquid 32. Therefore, the liquid 32 accommodated in the tank 30 is stirred, and temperature is liable to be uniform. The thermometer 50 is provided inside the tank 30, and the temperature of the liquid 32 is monitored by the thermometer 50. For example, in a case where the temperature of the liquid 32 measured by the thermometer 50 is largely higher than a target temperature, the opening of the regulator 38 is raised to raise the supply pressure of the compressed gas, to thereby increase the amount of the bubbles 44 and cool the liquid 32 strongly. On the other hand, in a case where the temperature of the liquid 32 measured by the thermometer 50 is slightly higher than the target temperature, for avoiding excessive cooling of the liquid 32, the opening of the regulator 38 is lowered to lower the supply pressure of the compressed gas, to thereby cool the liquid 32 gently.

With the supply pressure of the compressed gas to the filter 42 thus changed by operating the regulator 38, the intensity of a cooling effect on the liquid 32 by the bubbles 44 can be modified. Basically, the cooling effect can be intensified by raising the supply pressure of the compressed gas. However, it is confirmed that this cooling effect is leveled off when the pressure reaches a predetermined value. Considered to be a cause of this is that the amount of the bubbles 44 which can be discharged by the filter 42 is limited due to the internal structure of the filter 42. When the supply pressure of the compressed gas to the filter 42 is raised beyond the pressure resistance limit of the filter 42, the filter 42 may be broken or the compressed gas supply pipes 36 and 40 may be broken. On the other hand, if the supply pressure of the compressed gas to the filter 42 becomes too low, the lowering in temperature due to expansion of the compressed gas discharged into the liquid 32 becomes too low, and the liquid 32 cannot be cooled sufficiently. In view of this, the supply pressure of the compressed gas to the filter 42 is preferably, for example, in the range of 0.25 to 0.38 MPa. Note that the supply pressure is not limited to this range.

When the temperature of the liquid 32 measured by the thermometer 50 goes into the allowable range, it is confirmed that the liquid 32 accommodated in the tank 30 comes into the state suitable for supply to the cutting apparatus (processing apparatus) 2. A liquid feed passage 46 is connected to the tank 30, and a pump 48 is connected to an end portion of the liquid feed passage 46. The pump 48 has a function of sucking out the liquid 32 from the tank 30, and has a function of sending the liquid 32 from the fixed temperature liquid supply apparatus 24 to a predetermined object located in the exterior.

The fixed temperature liquid supply apparatus 24 is connected, for example, to the cutting apparatus (processing apparatus) 2 through a liquid feed pipe 26. With the pump 48 operated when the liquid 32 becomes a suitable temperature, the liquid 32 is sucked out of the tank 30, and the liquid 32 can be supplied to the cutting apparatus (processing apparatus) 2 through the liquid feed pipe 26. The liquid 32 sent to the cutting apparatus 2 is, for example, passed through a piping provided inside the cutting unit 16, and cools the rotational drive source for rotating the cutting blade 22 to maintain the rotational drive source at a predetermined temperature. It is recommendable that the liquid 32 raised in temperature by depriving heat of the rotational drive source be passed through a circulation pipe (not illustrated) and returned to the tank 30 of the fixed temperature liquid supply apparatus 24. It is recommendable that the liquid 32 returned to the tank 30 be cooled, inside the tank 30, by the bubbles 44 discharged from the filter 42, and again sent to the cutting apparatus (processing apparatus) 2. In other words, the liquid 32 functions as a coolant circulated between the cutting apparatus (processing apparatus) 2 and the fixed temperature liquid supply apparatus 24. Note that the use of the liquid 32 sent from the fixed temperature liquid supply apparatus 24 is not limited to the coolant but may be other use, and the liquid 32 that has already been used may not be returned to the tank 30 of the fixed temperature liquid supply apparatus 24.

In the cutting apparatus (processing apparatus) 2, during cutting of the workpiece 1, a cutting liquid (processing liquid) is supplied from the cutting water supply nozzles 28 to the cutting blade (processing tool) 22 and the workpiece 1. Here, if the cutting liquid is not at a fixed temperature, it would cause variability in the result of processing. In view of this, it is recommendable that the liquid at a fixed temperature sent from the fixed temperature liquid supply apparatus 24 be used as a cutting liquid (processing liquid). Note that cutting liquid (processing liquid) that has already been used contains much processing swarf, and it is unsuitable to return the cutting liquid (processing liquid) that has already been used to the tank 30 of the fixed temperature liquid supply apparatus 24 without a clarifying treatment.

Therefore, the cutting liquid that has already been used may not be returned to the fixed temperature liquid supply apparatus 24. In this case, if the operation of the fixed temperature liquid supply apparatus 24 is continued, the amount of the liquid 32 accommodated in the tank 30 is reduced.

When the amount of the liquid 32 accommodated in the tank 30 is reduced, the moving path through which the bubbles 44 discharged from the filter 42 reach the upper surface of the liquid 32 is shortened, and it is possible that the cooling effect on the liquid 32 by the bubbles 44 is reduced. In view of this, it is preferable that the liquid 32 be supplementarily supplied from an external liquid supply source to the tank 30, to keep constant the amount of the liquid 32 accommodated in the tank 30. In addition, also in a case of returning the liquid 32 that has already been used to the tank 30, the amount of the liquid 32 is reduced due to evaporation, and, accordingly, it is preferable that the liquid 32 be supplementarily supplied from the exterior to the tank 30. Note that the liquid 32 supplementarily supplied from an external liquid supply source to the tank 30 may be supplied to the filter 42 in mixture with the compressed gas supply pipe 36 from the compressed gas supply pipe 36, and may be discharged from the filter 42. When a mixed fluid of the compressed gas and the supplemental liquid is discharged from the filter 42, bubbles 44 with enhanced vigor are jetted into the liquid 32 accommodated in the tank 30, so that the bubbles 44 are widely diffused into the liquid 32, and the cooling effect of the bubbles 44 may be enhanced.

As has been described above, in the fixed temperature liquid supply apparatus 24 according to the present embodiment, the liquid 32 accommodated in the tank 30 can be cooled by the bubbles 44 of the compressed gas. In other words, the liquid 32 can be cooled by only a simple configuration, so that there is no need for large-scale cooling means which is driven by electric power. Therefore, the fixed temperature liquid supply apparatus 24 can be reduced in size. Besides, the electric power or motive power for operating the fixed temperature liquid supply apparatus 24 can be reduced, so that operation cost is also reduced.

Note that the present invention can be carried out with various modifications without restrictions by the description of the above embodiment and the like. For example, in the above embodiment, the case of cooling the liquid 32 accommodated in the tank 30 only with the bubbles 44 of the compressed gas has been described, but the fixed temperature liquid supply apparatus 24 according to one mode of the present invention is not limited to this. In other words, the fixed temperature liquid supply apparatus 24 may include a cooling device operated by electric power, and the liquid 32 accommodated in the tank 30 may be cooled by the cooling device.

In a case where the temperature of the liquid 32 accommodated in the tank 30 is extremely higher than a target temperature, much time is required for the temperature of the liquid 32 reaches a predetermined temperature if the liquid 32 is cooled by only the bubbles 44. Therefore, it may be impossible to supply the liquid 32 at a predetermined temperature to the processing apparatus at the timing required for the processing apparatus. In view of this, for example, a Peltier element operated by electric power to cool the liquid 32 may be provided inside the tank 30. Alternatively, the fixed temperature liquid supply apparatus 24 may include a blower for feeding airflow to the outside surface of the tank 30 to air-cool the tank 30. When these cooling devices operated by electric power are used, the liquid 32 accommodated in the tank 30 can rapidly be cooled. Note that, even in this case, the operation of the cooling device can be minimized by cooling the liquid 32 by the bubbles 44 by stopping the operation of the cooling device when the temperature of the liquid 32 approaches the predetermined temperature, and, therefore, the liquid 32 can be cooled efficiently.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A fixed temperature liquid supply apparatus that supplies liquid adjusted in temperature to a processing apparatus, the fixed temperature liquid supply apparatus comprising:
    a tank that accommodates the liquid;
    a thermometer that measures the temperature of the liquid accommodated in the tank; and
    a compressed gas supply pipe which reaches the tank, and which supplies compressed gas to the tank,
    wherein the liquid accommodated in the tank is cooled by bubbles of the compressed gas, and the cooled liquid is supplied to the processing apparatus.

2. The fixed temperature liquid supply apparatus according to claim 1, further comprising:
    a filter that is connected to an end of the compressed gas supply pipe that discharges the supplied compressed gas as the bubbles into the liquid.

3. The fixed temperature liquid supply apparatus according to claim 1, wherein the liquid supplied to the processing apparatus returns to the tank, is cooled by the bubbles, and is again supplied to the processing apparatus, to be thereby circulated.

4. The fixed temperature liquid supply apparatus according to claim 1, wherein the liquid supplied to the processing apparatus is utilized as a processing liquid.

5. The fixed temperature liquid supply apparatus according to claim 1,
    wherein the liquid is pure water, and
    the compressed gas is compressed air.

\* \* \* \* \*